Oct. 29, 1968      H. KELLNER      3,407,529

APPARATUS FOR THE TRANSPORTATION OF LIVING FISH

Filed Dec. 6, 1965

Hans Kellner
INVENTOR.

BY Karl G. Ross
Attorney

United States Patent Office 3,407,529
Patented Oct. 29, 1968

3,407,529
APPARATUS FOR THE TRANSPORTATION
OF LIVING FISH
Hans Kellner, Jainzendorfstrasse 2, Bad Ischl, Austria
Filed Dec. 6, 1965, Ser. No. 511,960
Claims priority, application Austria, Dec. 4, 1964,
A 10,276/64
5 Claims. (Cl. 43—57)

ABSTRACT OF THE DISCLOSURE

A device for the transportation of living fish in which a rectangular tank has its bottom and lateral walls lined with inflatable air cushions at least one of which forms a pillow between the tank and the back of the individual carrying the device, the air cushions being connected with nozzles for passing air through the water in the tank while an inlet tube is connected with the air cushions and receives air from the mouth of the carrier and a bellows mounted about its torso.

My present invention relates to apparatus for the transportation and temporary storage of living fish and, more particularly, to a portable device for the conveying of fish away from the usual fixed source of aerating fluid.

It has been a common practice heretofore to provide containers for the transportation and conveying of fish in a bath of water whereby the water is aerated during or prior to introduction of the fish and the fish extracting oxygen in the usual manner from the water. In such devices, it has been found impractical to close the container since, unless the quantity of water is excessive, the reduced contact of the bath with air prevents replenishment of oxygen in the water. Furthermore, even when the container is open to the atmosphere, it is usually necessary to change the water frequently to avoid the death of the fish due to oxygen depletion.

It is, therefore, an important objective of the present invention to provide a device for the transportation of live fish for prolonged periods and/or over long distances whereby the defects of earlier systems can be obviated.

A more specific object of this invention is to provide a relatively inexpensive, lightweight and simple apparatus for the live transportation of fish which affords satisfactory aeration of the water and thus does not require changing of the water at frequent intervals.

These objects, and others which will become apparent hereinafter are attained, in accordance with the present invention, through the provision of a device for the transportation of live fish which comprises, essentially, a receptacle containing the fish in a water bath and preferably composed of a rigid transparent synthetic resin and having a cover, and at least one inflatable bladder coextensive with at least one wall of the receptacle, and preferably all of the lateral and bottom surfaces thereof, this bladder having an aeration nozzle extending below the surface of the water in the receptacle for discharging a stream of oxygen-containing gas into the water. Advantageously, the nozzle is provided at the end of a tube connected with the bladder and extending over a wall of the receptacle while the bladder is provided with an inlet tube by means of which air or another oxygen-containing gas can be forced into the bladder for subsequent discharge through the aeration nozzle. This tube and the outlet tube for the nozzle can be provided with pinch-type or other valve means for controlling the aeration of the water and for preventing outflow of air when the inlet tube is disconnected from a source of air. This arrangement insures the continuous supply of air at any desired rate to the water through the aeration nozzle, since the air cushion along the walls of the receptacle forms a low-pressure storage reservoir of relatively high volume. Furthermore, the air cushion surrounding the water-containing receptacle constitutes a thermal insulation reducing any tendency toward sudden and drastic changes of water temperature.

The bladder or cushion of air can, according to a further feature of this invention, be subdivided into a plurality of individual cells or sections in the manner of a conventional air mattress, the cells being interconnected by the usual passages and the entire mattress arrangement having a single outlet for passage of the air to the nozzle. The air cushion is preferably composed of a synthetic resin and is so disposed upon the rigid outer walls of the receptacle that these outer walls define the air chambers with the flexible walls of the air cushion.

According to still another feature of this invention, the inlet tube can be provided with a mouthpiece for the direct inflation of the air cushion or cushions by the carrier of the apparatus and/or can be provided with a bellows assembly mounted on the torso of the carrier and activated by the latter's body movements to pump air into the cushion. To prevent outflow of air through the inlet tube, the latter preferably is provided with a check valve passing air in the inlet direction and preventing reverse flow. It has been found to be especially advantageous to form the receptacle as a back-carriable pack in the manner of a rucksack, whereby the shoulder straps are connected directly to the receptacle walls and the air cushion is disposed along the forward wall of the receptacle against the back of the carrier. This arrangement is particularly satisfactory since the pressure of the receptacle against the back of the user forces air from the cushion through the nozzle.

Furthermore, the cushion softens the load of the receptacle and provides an effective means for determining when the cushion and thus the air supply for aeration is depleted. This is particularly important when the device is used by sport fishermen, since it enables them to tell precisely when addition of air to the cushion is required.

According to still another feature of the present invention, the inlet means for supplying air to the cushion is two-fold and includes a tube or pipe provided with a mouthpiece through which the user of the device can exhale to fill the cushion. In addition, the inlet means can include a duct connected to an air pump on the torso of the carrier and preferably formed as a belt surrounding the user's midsection or chest. The belt can be constituted as a tube-like ring which is filled with air and constitutes a life preserver for swimmer carrying the device; the belt connects with the air cusion or supports the bellows assembly previously described. The pump arrangement, which is thus actuated during inhalation and exhalation of the carrier, can be connected to the nozzle and the cushion simultaneously, thereby reinforcing the aeration stream during each stroke of the pump. In this arrangement, the inhalation period results in a compression of the bellows and the reinforcement of the aeration stream supplied through the nozzle while exhalation delivers a supply of air through the other tube directly to the cushion. The rucksack assembly also can be constituted in the manner of a swimming vest or the like.

These objectives, features, and advantages of the present invention will be more readily apparent from the following description, reference being made to the accompanying drawing in which.

Figure 1:
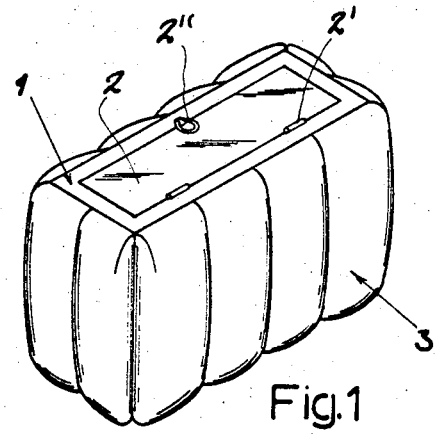
FIG. 1 is a perspective view of a receptacle for the transportation of living fish according to this invention.

In FIG. 1, I show a receptacle generally designated by the numeral 1, whose cover, 2, completely encloses this receptacle and is hinged thereto at 2'. The cover 2 is provided with a catch 2'' for securing the cover in its closed position. The lateral walls 1a and bottom wall 1b of the receptacle 1 are substantially co-extensive with the individual air cushions 3a, 3b which are connected together as the individual cells of an air mattress 3 completely encompassing the receptacle except for the cover thereof. The cover and lateral walls of the receptacle are composed of a rigid transparent synthetic resin, while the walls of the air cushion are formed from a flexible synthetic resin fitted to the rigid walls and forming the air chambers therewith. The receptacle 1 contains a supply of water 12 to maintain living fish, the water being aerated through a diffusion nozzle 6 held below the surface of the water and close to its bottom by a rigid tube 5 fastened on an inner surface of the receptacle wall.

Figure 2:
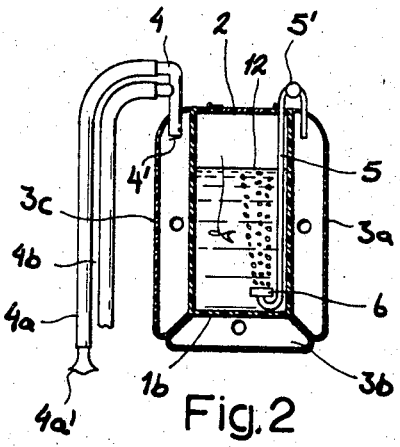
FIG. 2 is a cross-sectional view through the receptacle showing the inlet means and nozzle thereof.
Figure 3:
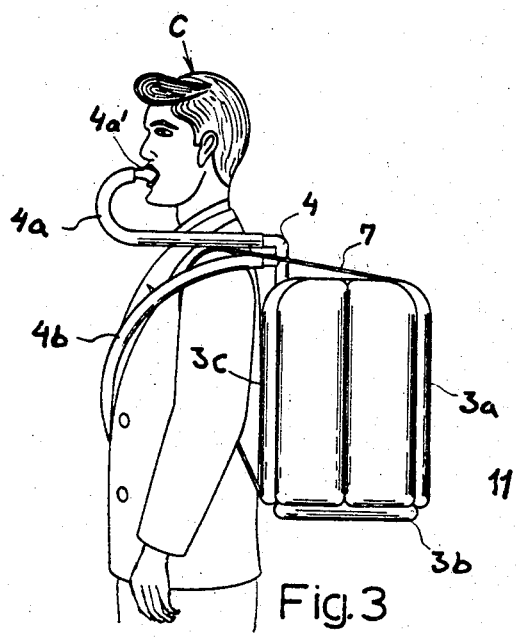
FIG. 3 is a view of the device of the present invention mounted as a rucksack on the back of a carrier.
Figure 4:
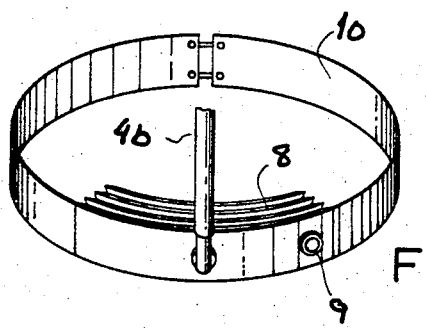
FIG. 4 is a perspective view of a bellows-like pump for use with the receptacle.

The tube 5 connects with the air cushion 3a as seen in FIG. 2, so that air passes from the cushions through the nozzle 6 into the water and suffices to sustain the fish. The air cushions 3a, 3b and 3c, etc., are filled by an inlet means including a duct or tube for opening into the air cushions and having a check valve 4' for preventing outflow of air from the cushions through the inlet tubes. One branch, 4a, of the inlet tube is provided with a mouthpiece 4a' through which the carrier C transporting the receptable can exhale to inflate the air cushions 3a through 3c. The other branch 4b of the inlet tube is connected to the bellows or other pump means, illustrated, for example, in FIG. 4. As can be seen from FIG. 3, the air cushion 3c can be disposed between the back of the carrier C and the wall 1a of the prismatic receptacle so that the shoulder straps 7 supporting the receptacle on the back of force air through the nozzle 6. As the carrier transports the receptacle, each inhalation period operates the bellows 8 on the strap 10 about the waist or chest of the carrier C to pump air induced through the check valve 9 through the pipe 4b into the air cushions 3a through 3c. Each exhalation forces air through the pipe 4a into the air cushion from which it flows to the nozzle substantially uniformly. A valve 5' can be provided in the line 5 to control the rate of aeration.

Figure 5:
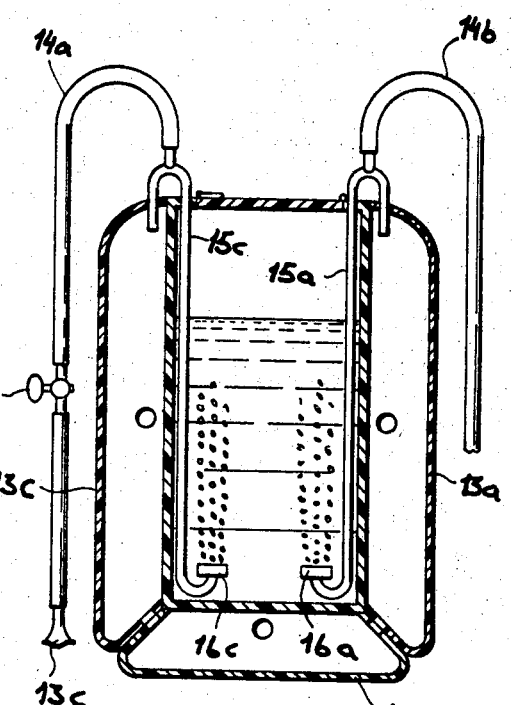
FIG. 5 is a view similar to FIG. 2 of a modified system.

In the system of FIG. 5, the tube 14a opens into the air cushion 13c, and simultaneously feeds a pipe 15c having an aeration nozzle 16c. A valve 11, in the form of a stopcock or pinch valve, is provided to prevent the escape of the air from the cushion 13a when the latter is inflated. A mouthpiece 14a' is provided for the pipe 14a to enable the carrier to inflate the air cushion 13c. A separate air cushion 13a is supplied by the pipe 14b from the bellows, part of the air being branched to the pipe 15a and the nozzle 16a. Cushion 13b can be connected to either or both cushions 13a and 13c.

The foregoing invention can be modified in many ways, which will be apparent to those skilled in the art but which are encompassed within the spirit and scope of the above claims.

I claim:

1. A device for the transportation fo living fish, comprising an upwardly open water-containing receptacle for said fish, said receptacle having lateral walls and a bottom wall; at least one inflatable air cushion means formed along one of said walls; nozzle means connected by tube means with said air cushion means and disposed below the surface of the water in said receptacle for discharging a stream of aeration fluid into the water therein; and inlet means secured with said cushion means for supplying air into said cushion means, said inlet means including a tube extending therefrom connected to a source of aerating fluid, check-valve means in said inlet means for preventing outflow of air from said cushion through said tube, and wherein said source of aerating fluid is a bellows connected with said tube and actuatable by the body movement of a carrier of said receptacle for pumping air into said cushion means.

2. A device as defined in claim 1 wherein said inlet means includes a second tube extending therefrom and said second tube is providedwith a mouthpiece on an end thereof through which a carrier of said receptacle can blow air into said cushion means.

3. A device as defined in claim 1 wherein said bellows is mounted upon a strap adapted to surround the torso of a carrier of said receptacle.

4. A device as defined in claim 1 wherein said bellows communicates through said inlet means simultaneously with said cushion means and with said nozzle means.

5. A device for the transportation of living fish, comprising an upwardly open water-containing receptacle for said fish, said receptacle having lateral walls and a bottom wall; inflatable air cushion means formed along one of said walls providing an air chamber; nozzle means connected by a tube with the interior of said air cushion means and disposed below the surface of the water in said receptacle for discharging a stream of aeration fluid into the water therein; inlet means including a check valve provided in said cushion means for supplying air into air chamber, said receptacle being of rectangular parallelepipedal configuration, said walls of said receptacle being composed of a relatively rigid synthetic resin, said air chamber being defined between said one of said walls and said cushion means made of a flexible layer of synthetic resin substantially coextensive therewith, said inlet means comprising a tube having one end communicating within said cushion means and a mouthpiece on the other end of said tube for orally supplying air into said cushion means to maintain said cushion means inflated and to deliver air to said receptacle through said nozzle means to aerate the water in said receptacle, said cushion means overlying substantially all of said walls and being subdivided into a plurality of cells in flow communication; and strap means secured with said device forming a rucksack whereby the device is transportable on the back of a carrier, said cushion means being disposed between said one of said walls and the back of the carrier for compression thereagainst to force said fluid through said nozzle means.

References Cited

UNITED STATES PATENTS

| 1,991,149 | 2/1935 | Haislip | 43—56 |
| 2,782,552 | 2/1957 | Adams et al. | 43—57 |
| 2,883,789 | 4/1959 | Schwartz | 43—57 |
| 3,092,926 | 6/1963 | Baker | 43—57 |

FOREIGN PATENTS 300,282   6/1955   Switzerland.

HUGH R. CHAMBLEE, Primary Examiner.